C. F. MERRIAM.
PROCESS OF PRODUCING EDUCATIONAL PHOTOGRAPHS.
APPLICATION FILED AUG. 12, 1920
1,427,615.
Patented Aug. 29, 1922.
2 SHEETS—SHEET 1.
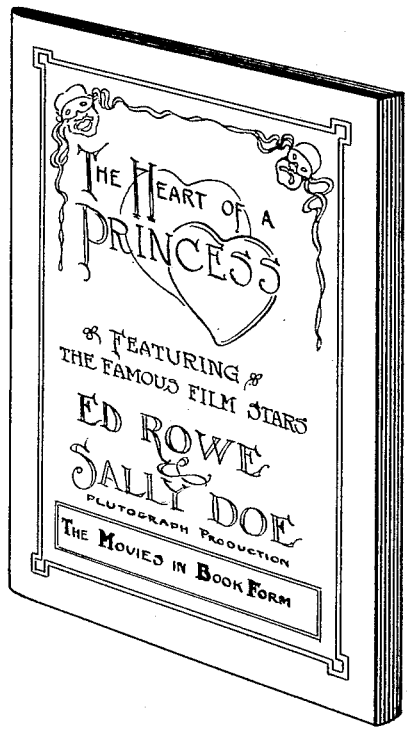
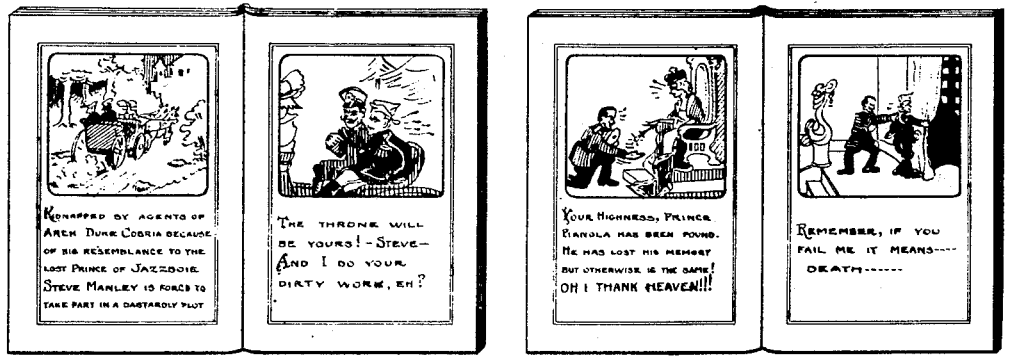
WITNESSES
INVENTOR
CHARLES F. MERRIAM
BY
ATTORNEYS

UNITED STATES PATENT OFFICE.

CHARLES FREDERIC MERRIAM, OF TRENTON, NEW JERSEY.

PROCESS OF PRODUCING EDUCATIONAL PHOTOGRAPHS.

1,427,615.  Specification of Letters Patent.  Patented Aug. 29, 1922.

Application filed August 12, 1920. Serial No. 402,943.

*To all whom it may concern:*

Be it known that I, CHARLES F. MERRIAM, a citizen of the United States, and a resident of Trenton, in the county of Mercer and State of New Jersey, have invented a new and Improved Process of Producing Educational Photographs, of which the following is a full, clear, and exact description.

This invention relates to a book and the method of producing the same, and has for an object to utilize material prepared for other purposes, and assemble the desired information into a book.

Another object is the method of using moving picture scenes at certain stages of the scenes for producing still pictures which when assembled will give a substantial, complete and accurate story of the matter presented by the moving pictures when completed.

In the accompanying drawings—

Figure 1 is a perspective view of a completed book constructed according to the present invention.

Fig. 2 is a book showing the first two pages of the book illustrated in Fig. 1.

Fig. 3 is a perspective view similar to Fig. 2, but showing the second set of pictures.

Figure 4:
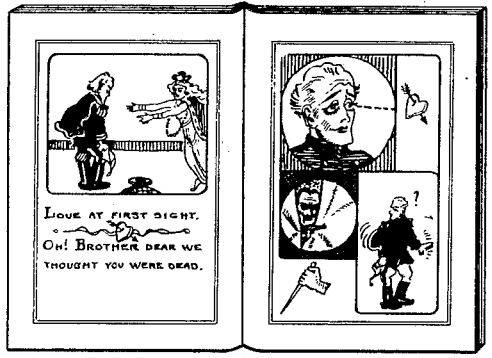
Fig. 4 is a perspective view similar to Fig. 2, but showing a third set of pictures.
Figure 5:
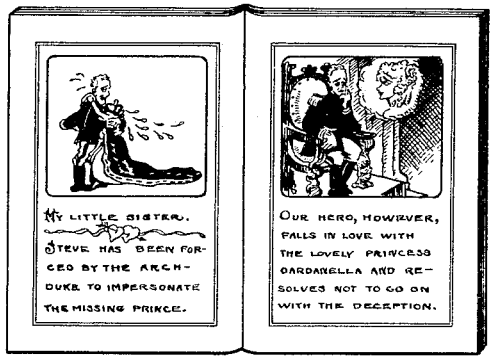
Fig. 5 is a perspective view similar to Fig. 2, but showing a fourth set of pictures.
Figure 6:
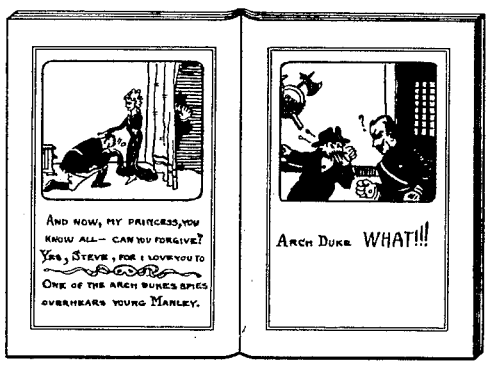
Fig. 6 is a perspective view similar to Fig. 2, but showing a fifth set of pictures.
Figure 7:
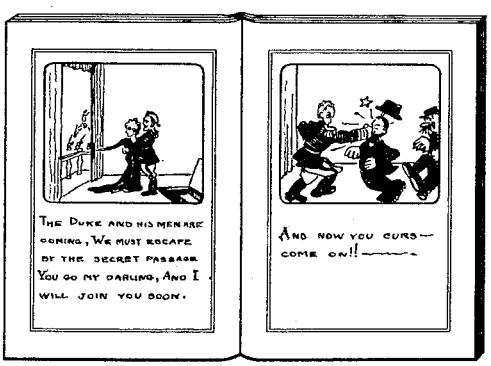
Fig. 7 is a perspective view similar to Fig. 2, but showing a sixth set of pictures.
Figure 8:
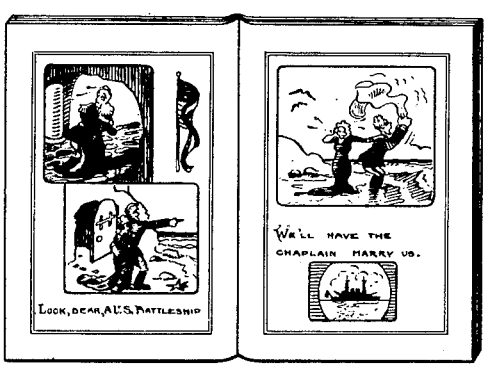
Fig. 8 is a perspective view similar to Fig. 2, but showing a seventh set of pictures.
Figure 9:
Fig. 9 is a perspective view similar to Fig. 2, but showing an eighth set of pictures.

In the modern moving picture industry not only is there provided pictures showing comedy, but many other varieties of pictures, as for instance scenes illustrating different parts of the country, scenes illustrating historical incidents, as for instance the landing of Columbus, and pictures illustrating the life of a person. Usually the pictures and the surroundings are gotten up in such a manner to not only provide facts, but to please the audience, and consequently scenes are presented which may be unnecessary when looking for only facts. In the present invention it is aimed to utilize the scenes provided by moving picture companies and to select the principal or outstanding scenes which will present the principal facts to be secured or the scenes which will disclose fully the plot of the play being enacted.

In the accompanying drawings a book has been shown which illustrates the principal views of a moving picture film which views have been titled to indicate to an observer a full plot and the principal instances provided. The particular disclosure in the drawing shows the principal scenes and brings out clearly the facts resulting in the meeting of the hero and heroine and also the pictures bring out the facts which results in the eventual marriage of these two parties on a war vessel. Where a moving picture company is staging the landing of Columbus or some other historical fact a special photographer would photograph with still pictures the principal scenes in the landing and the events associated therewith. These pictures would then be assembled in their proper sequence so as to illustrate successively the different movements of Columbus and others in the landing and other events. The resulting book will be in the nature of an educational production rather than a book for amusement. To get the best results, however, a student would view the moving pictures at a display house and then utilize the book for refreshing and fixing in his memory the events depicted therein.

I claim:

The method of forming a book from photographs for illustrating a plot or event, comprising staging the successive scenes in the plot or event for moving picture purposes, taking a still photograph of each principal scene while the scene is being photographed for a moving picture film, adding headings to each photograph, giving a synopsis of the events staged, and assembling said still photographs in book form in the proper sequence to present the successive events in their proper sequence.

CHARLES FREDERIC MERRIAM.